(12) United States Patent
Chen

(10) Patent No.: US 12,448,525 B2
(45) Date of Patent: Oct. 21, 2025

(54) AQUEOUS PRIMER COMPOSITIONS AND METHODS THEREOF

(71) Applicant: 3M INNOVATIVE PROPERTIES COMPANY, St. Paul, MN (US)

(72) Inventor: Lianzhou Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 772 days.

(21) Appl. No.: 17/762,983

(22) PCT Filed: Oct. 15, 2020

(86) PCT No.: PCT/IB2020/059715
§ 371 (c)(1),
(2) Date: Mar. 23, 2022

(87) PCT Pub. No.: WO2021/079238
PCT Pub. Date: Apr. 29, 2021

(65) Prior Publication Data
US 2022/0356357 A1 Nov. 10, 2022

Related U.S. Application Data

(60) Provisional application No. 62/923,765, filed on Oct. 21, 2019.

(51) Int. Cl.
| | |
|---|---|
| C09D 5/00 | (2006.01) |
| C08K 3/36 | (2006.01) |
| C09D 5/02 | (2006.01) |
| C09D 5/08 | (2006.01) |
| C09D 7/61 | (2018.01) |
| C09D 163/04 | (2006.01) |

(52) U.S. Cl.
CPC ............ C09D 5/002 (2013.01); C08K 3/36 (2013.01); C09D 5/022 (2013.01); C09D 5/08 (2013.01); C09D 7/61 (2018.01); C09D 163/04 (2013.01)

(58) Field of Classification Search
CPC . C08L 63/04; C08L 2205/02; C08L 2207/324
See application file for complete search history.

(56) References Cited

U.S. PATENT DOCUMENTS

| | | | |
|---|---|---|---|
| 5,641,818 A | 6/1997 | Sweet et al. | |
| 6,475,621 B1 | 11/2002 | Kohli et al. | |
| 9,512,336 B2 | 12/2016 | Zhao et al. | |
| 2018/0030199 A1* | 2/2018 | Walker | C08K 3/01 |

FOREIGN PATENT DOCUMENTS

| | | | | |
|---|---|---|---|---|
| JP | 2004083784 | * | 3/2004 | |
| JP | 2004123779 | | 4/2004 | |
| WO | 9406876 | | 3/1994 | |
| WO | 2009036790 A1 | | 3/2009 | |
| WO | 2016106346 A1 | | 6/2016 | |
| WO | WO-2018175730 A1 | * | 9/2018 | ........... C09D 163/00 |

OTHER PUBLICATIONS

Translation of JP2004083784 (Year: 2004).*
International Search Report for PCT International Application No. PCT/IB2020/059715, mailed on Feb. 4, 2021, 4 pages.

* cited by examiner

*Primary Examiner* — Robert C Boyle
(74) *Attorney, Agent, or Firm* — Carlos M. Téllez Rodríguez; 3M Innovative Properties Co

(57) ABSTRACT

Provided is an aqueous primer composition including a first thermosetting resin that is a particulate solid at ambient conditions and a second thermosetting resin that is liquid at ambient conditions and acting as a reactive coalescent agent in which the first thermosetting resin is at least partially soluble. The second thermosetting resin acts as a coalescent agent to enable a continuous primer film to be formed as the primer is being dried before it is cured. The composition further includes a curative that is substantially water-insoluble and reactive with the first and second thermosetting resins. The overall composition can contain up to 4 percent by weight of volatile solvents, other than water and provides a shelf-stable primer that can form a continuous film without the need for added organic solvents.

10 Claims, No Drawings

AQUEOUS PRIMER COMPOSITIONS AND METHODS THEREOF

This application is a national stage filing under 35 U.S.C. 371 of PCT/IB2020/059715, filed Oct. 15, 2020, which claims the benefit of Provisional Patent Application No. 62/923,765, filed Oct. 21, 2019, the disclosure of which is incorporated by reference in its/their entirety herein.

FIELD OF THE INVENTION

Provided are aqueous primer compositions useful for protecting a substrate from corrosion. The provided aqueous primer compositions can be applied to primary and secondary aircraft structures.

BACKGROUND

Aircraft manufacturers go to great lengths to ensure the long-term durability of their aircraft. As many aircraft structures are made from metals such as steel or aluminum, protecting these parts from corrosion is a primary concern. Chemical corrosion can be caused by exposure to caustic cleaning agents, while electrochemical corrosion can be induced by exposure to conductive liquids such as salt water. Both can be exacerbated by high temperatures, humidity, and corrosive marine environments, which are commonly encountered in aircraft applications.

Corrosion can be avoided by applying onto the metal surfaces a primer coating (or film) that acts as a barrier layer on the surfaces of vulnerable metal structures. For added protection, it is possible to add corrosion inhibitors to such primers. Conventionally, corrosion inhibitors for aluminum alloys are derived from hexavalent-chromium compounds, which are used in both surface preparation and organic primer compositions. These chromium compounds generally include chromates, which are salts with an anion containing chromium and oxygen, such as $CrO_4^{2-}$. These primers not only protect the underlying substrate but also promote adhesion to various adhesives, including structural adhesives, that are later bonded to the substrate.

Chromates are effective against corrosion, but have become increasingly disfavored because of environmental, health, and safety concerns. Evolving regulatory regimes have caused manufacturers to explore use of fundamentally new primer systems capable of meeting new regulatory standards.

SUMMARY

Existing primers are generally classified as either water-based (i.e., aqueous) or organic solvent-based. Organic solvent-based primers contain curable resins dissolved in a low-viscosity organic solvent that directly wets the substrate to be coated. Aqueous primers, which use water as a volatile solvent, are provided in the form of a latex-emulsified particles of a thermosetting resin dispersed in aqueous dispersion. Typically, the dispersion is coated onto a substrate, dried, and then heated to cure the thermosetting resin.

While aqueous solutions can greatly reduce emissions of volatile organic solvents, the development of these solutions introduces new technical challenges attributable to the unique wetting behavior of aqueous compositions. The resin and curative particles in these compositions are usually high melting point or high softening point solids, and do not form a smooth and continuous film when dried. Instead, these coatings tend to have a rough and powder-like texture and can be vulnerable to chips and scratches when coated parts are handled. The heterogenous nature of these coatings can also degrade the chemical and corrosion resistance of the cured system.

One potential solution to this problem is to introduce an organic solvent into the emulsion to coalesce the resin particles as the emulsion dries and enhance the film-forming ability of the composition. A drawback of this approach is the tendency for these compositions to have reduced stability during primer storage, reduced wetting capability when drying and curing the primer, and greater variability in product performance. The need remains for a chromate-free aqueous primer composition that remains stable during storage and application, facilitates handling and transportation of coated parts before and after curing, and provides superior chemical and corrosion resistance.

Described herein are primer compositions in which a reactive liquid epoxy, rather than a non-reactive organic solvent, serves as a coalescent agent to enable a continuous primer film to be formed during the course of the drying and curing steps of the process above. Advantageously, this process allows formation of a continuous film without the need for added organic solvents. By solving this technical dilemma, these primer compositions can simultaneously provide a primer film that is uniform upon curing, improves surface protection, and displays a high degree of storage stability in its uncured state.

In a first aspect, an aqueous primer composition is provided. The aqueous primer composition comprises: a first thermosetting resin that is a particulate solid at ambient conditions; a second thermosetting resin that is liquid at ambient conditions and acting as a reactive coalescent agent in which the first thermosetting resin is at least partially soluble; and a curative that is substantially water-insoluble and reactive with the first and second thermosetting resins, wherein the aqueous primer composition contains up to 4 percent of volatile solvents, other than water, relative to the overall weight of the aqueous primer composition.

In a second aspect, a method of providing a continuous primer film on a substrate is provided, comprising the steps of: disposing onto the substrate the aqueous primer composition; removing water from the aqueous primer composition; coalescing the first thermosetting resin within the second thermosetting resin; and reacting the first and second thermosetting resins with the curative to obtain the continuous primer film.

In a third aspect, a method of making an aqueous primer composition is provided, comprising the steps of: dispersing in water a first thermosetting resin, a second thermosetting resin that is liquid at ambient conditions in which the first thermosetting resin is at least partially soluble, and a water-insoluble curative to obtain a resin emulsion, wherein the first thermosetting resin and the water-insoluble curative are particulate solids at ambient conditions; and processing the particulate solids to a median particle size of from 50 nanometers to 300 micrometers for the thermosetting resin and a median particle size of from 50 nanometers to 300 micrometers for the water-insoluble curative, wherein the aqueous primer composition contains up to 4 percent by weight of volatile solvents, other than water, relative to the overall weight of the aqueous primer composition.

Definitions

As used herein:

"ambient conditions" means at a temperature of 25° C. and a pressure of 1 atmosphere (i.e., 101.3 kPa);

"ambient temperature" refers to a temperature of 25° C.;

"average" refers to a number average by default, unless otherwise specified;

"cure" refers to chemically crosslinking, such as by exposing to radiation in any form, heating, or allowing to undergo a chemical reaction that results in hardening or an increase in viscosity (e.g., under room temperature or heated conditions);

"polymeric" refers to a molecule having a plurality of repeating units;

"solvent" refers to a liquid capable of dissolving a solid, liquid, or gas, such as silicones, organic compounds, water, alcohols, ionic liquids, and supercritical fluid;

"substantially" refers to a majority of, or mostly, as in an amount of at least 50%, 60, 70, 80, 90, 95, 96, 97, 98, 99, 99.5, 99.9, 99.99, or 99.999%, or 100% of a composition based on weight or volume;

"substantially free of" means having a trivial amount of, such that a composition is 0 wt % to 5 wt % of a given component, or 0 wt % to 1 wt %, or 5 wt % or less than, equal to, or greater than 4.5 wt %, 4, 3.5, 3, 2.5, 2, 1.5, 1, 0.9, 0.8, 0.7, 0.6, 0.5, 0.4, 0.3, 0.2, 0.1, 0.01, or 0.001 wt %, or 0 wt % of the component; and "substituted" refers to the state in which one or more hydrogen atoms contained therein are replaced by one or more non-hydrogen atoms.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Primer Compositions

The disclosed primer compositions can be used to protect a surface against corrosion, promote adhesion, and enhance bond durability in operating conditions. In aerospace applications, such operating conditions include exposure to salt, moisture and wide thermal fluctuations.

The primer compositions can be disposed onto any of a number of possible substrates. Substrates commonly encountered in the aircraft industry include aluminum, aluminum cladding, titanium, and fiber-reinforced composites. The range of potential substrates, however, need not be so limited. In alternative applications, for example, the primer compositions can be applied to painted substrates, thermoplastic substrates, electroplated metal substrates, and metal substrates in general.

Exemplary primer compositions are aqueous primers based on a curable resin dispersed in water. As used herein, the terms "dispersed" and "dispersion" refer to finely divided particles of a liquid and/or solid first component dispersed in a liquid second component. When the particles of the first component are stabilized within the second component, with or without the inclusion of a suitable surfactant, the dispersion is commonly referred to as an emulsion. When the first component is polymeric, the emulsion is commonly referred to as a latex emulsion.

In the provided primer compositions, the first component includes a plurality of components. The plurality of components includes at least two thermosetting resins capable of being collectively cured to form a polymeric network. At least one first thermosetting resin is solid at ambient conditions and at least one second thermosetting resin is liquid at ambient conditions. The provided primer compositions also contain a curative that is substantially water-insoluble and reacts with the first and second thermosetting resins as the primer is curing.

Advantageously, the first thermosetting resin is at least partially soluble in the second thermosetting resin, enabling the second thermosetting resin to act as a reactive coalescent agent for the primer composition. As water is evacuated from the primer composition, the coalescent agent enables the particulate solids of the first thermosetting resin to flow into each other and form, with the liquid thermosetting resin, a relatively smooth and continuous film. The film formed from the primer composition can be non-tacky, which facilitates user handling of a primed substrate prior to curing.

With the second thermosetting resin acting as a coalescent agent, there is reduced need for an inert coalescent solvent, which is often used in conventional aqueous primer compositions. Depending on the resins selected for use in the primer composition, the aqueous primer composition can contains up to 4 percent, up to 3 percent, up to 2 percent, or in some embodiments, less than, equal to, or greater than 0.25 percent, 0.5, 0.75, 1, 1.2, 1.5, 1.7, 2, 2.5, 3, 3.5, 4, 4.5, or 5 percent of volatile solvents, other than water, relative to the overall weight of the aqueous primer composition. In some embodiments, the primer composition is substantially free of any volatile solvents, other than water.

The first thermosetting resin, which is a particulate solid at ambient temperature, can be comprised an epoxy, bismaleimide, phenolic, or unsaturated polyester resin. In some embodiments, the thermosetting resin can include a mixture of two or more of the aforementioned resins.

Suitable epoxy resins include conventional epoxy resins having an average functionality of at least 1.5, 1.6, 1.7, 1.8, 1.9, 2, 2.1, 2.2, 2.2, 2.4, 2.5, 2.7, 3, 3.5, 4, or greater. In some embodiments, the epoxy resin contains substantially no ionic or ester groups. Epoxy resins can be chain-extended, glycidyl ethers of phenols, such as resorcinol and the bisphenols, e.g., bisphenol A and bisphenol F. Other useful epoxy resins are solid novolac epoxy resins and solid diglycidyl ethers of bisphenol A ("DGEBA") resins.

Commercially available epoxy resins include EPON SU-8, a polymeric epoxy resin with an average functionality of 8, melting point of 82° C., and an epoxy equivalent weight of 215 g/mol, from Hexion, Inc., Columbus, OH; DER 669, a high molecular weight solid epoxy resin having a softening point of 135-155° C. and an epoxy equivalent weight of 3500-5500 g/mol from the Dow Chemical Company; EPON 1002, a solid DGEBA epoxy having an epoxy equivalent weight of 550-650 g/mol and a melting point of from 75-85° C., also from Hexion, Inc., Columbus, OH; and ARALDITE ECN 1273, 1280, and 1299 novolac solid epoxy resins having epoxy functionalities from 3.8 to 5.4, epoxy equivalent weights of from 225-235 g/mol, and melting points of from 73-99° C., from Huntsman Corporation, The Woodlands, TX.

Representative epoxy comonomer resins are disclosed in the treatise Handbook of Epoxy Resins, McGraw-Hill, Inc., 1967. Examples of such resins include bisglycidyl ethers of bisphenols, such as bisphenol A, bisphenol F, and bisphenol S. Also suitable are the various phenolic and cresolic novolac-type resins, as well as the venous glycidoxy amines and aminophenols, particularly N,N,N',N'-tetrakis(glycidyl)-4,4-diaminodiphenyl methane and N,N,O-tris(glycidyl)-4-aminophenol. Use of epoxy resins based on the glycidylethers of the various dihydroxy-naphthalenes and phenolated dicyclopentadienes are also possible.

Useful phenolic resins include novolac type phenolic resins, where the ratio of o-methylene to p-methylene bond is up to 1 and/or a resole type phenolic resin. Mixtures of novolac type and resole type phenolic resins may be used.

The first thermosetting resin can be comprised of primary particles having a median particle size (D50) of from 0.05 micrometers to 300 micrometers, from 0.2 micrometers to 200 micrometers, from 1 micrometer to 100 micrometers, or in some embodiments, less than, equal to, or more than 0.05 micrometers, 0.1. 0.2, 0.3, 0.4, 0.5, 0.7, 1, 2, 3, 4, 5, 6, 7, 8, 9, 10, 12, 15, 17, 20, 25, 30, 35, 40, 45, 50, 55, 60, 65, 70, 75, 80, 85, 90, 95, 100, 120, 150, 170, 200, 250, or 300 micrometers.

Relative to the overall weight of the primer composition excluding volatile solvents, the solid thermosetting resin or resins can be present in an amount of from 20 percent to 70 percent, from 30 percent to 60 percent, from 30 percent to 55 percent, or in some embodiments, less than, equal to, or greater than 20 percent, 25, 30, 35, 40, 45, 50, 55, 60, 65, or 70 percent.

The second thermosetting resin, which is liquid at ambient conditions, can be comprised of one or more epoxy resins. Suitable liquid epoxy resins include bisphenol A and bisphenol F epoxy resins, liquid novolac epoxy resins, N,N,N',N'-tetraglycidyl-4,4'-diaminodiphenylmethane, N,N,O-tris(glycidyl)-4-aminophenol. In some embodiments, the liquid epoxy resin is provided in the form of a non-ionic aqueous dispersion. Commercially available resins that could be used for the second thermosetting resin include those available under the trade designation EPI-REZ by Hexion Inc., Columbus, OH.

Suitable liquid epoxy resins include epoxy resins that are multifunctional and have an epoxy functionality of two or more. Liquid epoxy resins can include one or more novolac resins, which can provide a high crosslink density due to their high epoxy functionality.

The liquid epoxy resin can have a molecular weight of from 100 g/mol to 1000 g/mol, from 120 g/mol to 700 g/mol, from 150 g/mol to 500 g/mol, or in some embodiments, less than, equal to, or greater than 100 g/mol, 110, 120, 130, 140, 150, 160, 170, 180, 190, 200, 250, 300, 350, 400, 450, or 500 g/mol.

When dispersed in water, particles of the second thermosetting resin can have a median primary particle size (D50) of from 0.1 to 10, from 0.2 to 7, from 0.5 to 5, or in some embodiments, less than, equal to, or greater than 0.05 micrometers, 0.1, 0.2, 0.5, 0.7, 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 250, or 300 micrometers.

The liquid thermosetting resin or resins can be present in an amount of from 5 percent to 40 percent, from 10 percent to 30 percent, from 10 percent to 25 percent, or in some embodiments, less than, equal to, or greater than 5 percent, 6, 7, 8, 9, 10, 12, 15, 17, 20, 22, 25, 27, 30, 32, 35, 37, or 40 percent, relative to the overall weight of the primer composition excluding volatile solvents.

The provided compositions further contain a curative that can react with the first and second thermosetting resins under the desired curing conditions, typically at primer bake temperatures. For extended shelf-stability, it is preferable that the curative is both solid and insoluble in water so there is minimal reaction between the curative and the thermosetting resins during storage of the primer composition. Premature reaction between the curative and the thermosetting resins can lead to viscosity and primer wetting issues during the melting and curing processes, and is generally undesirable.

Suitable water-insoluble curatives include aromatic amines and mixtures thereof. Exemplary aromatic amines include 4,4'-diaminodiphenylmethane, 2,2-bis(4-[4-aminophenoxy]phenyl)propane, 3,3'- and 4,4'-diaminodiphenylsulfone, 3,3'- and 4,4'-diaminodiphenyloxide, 3,3'- and 4,4'-diaminodiphenyloxide, 3,3'- and 4,4'-diaminodiphenylsulfide, 3,3'- and 4,4'-diaminodiphenylketone, and 4,4'-[1,4-phenylene(1-methylethylidene)]-bis(benzeneamine).

Solid diamine curatives include 2,4-toluenediamine, 1,4-phenylenediamine, 2,2-bis(4-aminophenyl)hexafluoro propane, 2,2-bis(3-amino-4-hydroxyphenyl)hexafluoro propane, 3,4'-diaminodiphenyloxide, 9,9-bis(4-aminophenyl)fluorene, o-toluidine sulfone, and 4,4'-diaminobenzanilide. Particularly preferred are 9,10-bis(4-aminophenyl)anthracene, 2,2-bis(4-[3-aminophenoxy]phenyl)sulfone, 2,2-bis(4-[4-aminophenoxy]phenyl)sulfone, 1,4-bis(4-aminophenoxy)biphenyl, bis(4-[4-aminophenoxy)phenyl) ether, and 2,2-bis([4-(4-amino-2-trifluorophenoxy)] phenyl)hexafluoropropane.

Preferred aromatic amines include 2,2-bis-[4-(4-aminophenoxy)-phenyl]propane, 2,2'-diaminodiphenyl sulfone, 4,4'-diaminodiphenyl sulfone, and mixtures thereof. Options and advantages concerning the aforementioned curatives can be found in U.S. Pat. No. 5,641,818 (Sweet) and U.S. Pat. No. 6,475,621 (Kohli et al.).

In preferred embodiments, the solid curative has a melting point of below 250° F., below 240° C., or below 220° F.

The composition can further contain one or more curative and/or catalysts to facilitate curing of the primer. These components can be water-soluble or water-insoluble. Suitable curatives include a water-soluble, substituted amino triazines (examples of which are commercially available under the trade designation CUREZOL), a modified polyamine available under the trade designation ANCAMINE, dicyandiamide (DICY), bisurea-based curing agents, such as toluene-2,4-bis(N,N' dimethyl urea) (available under the trade designation OMICURE from Emerald Performance Materials LLC, Vancouver, WA), and water insoluble amine-epoxy adducts and aromatic amines such as 2,2-Bis[4-(4-aminophenoxy)phenyl]propane" (BAPP).

The particulate curative can have a median primary particle size (D50) of from 0.05 micrometers to 300 micrometers, from 0.2 micrometers to 200 micrometers, from 1 micrometers to 100 micrometers, or in some embodiments, less than, equal to, or greater than 0.05 micrometers, 0.1, 0.2, 0.5, 0.7, 1, 2, 3, 4, 5, 6, 7, 8, 9, 10, 15, 20, 25, 30, 35, 40, 45, 50, 55, 60, 65, 70, 75, 80, 85, 90, 95, or 100 micrometers.

The water-insoluble curative can be present in an amount of from 0.5 wt % to 40 wt %, from 5 wt % to 30 wt %, from 10 wt % to 20 wt %, or in some embodiments, less than, equal to, or more than 0.5%, 0.6, 0.7, 0.8, 0.9, 1, 1.5, 2, 2.5, 3, 4, 5, 6, 7, 8, 9, 10, 12, 15, 17, 20, 22, 25, 26, 27, 28, 29, 30, 31, 32, 33, 34, 35, 36, 37, 38, 39, or 40%, based on the overall weight of the primer composition excluding volatile solvents.

As mentioned previously, it is preferable for the amount of coalescent solvent, if present at all, to be small. If present, however, it is preferable for the coalescing solvent to have an evaporation rate less than that of water but high enough to allow for proper film formation under a wide range of temperature and humidity conditions. The evaporation should be high enough that the coalescent solvent can be expunged from the primer film during curing.

The composition may further contain any of a number of dyes, pigments, fillers, leveling agents, additional dispersing agents, thickeners, and corrosion inhibitors known in the art.

Corrosion inhibitors are chemical compounds that, when added to the primer composition, decrease the corrosion rate of the substrate on which the primer is applied. Corrosion can pose a major problem in aerospace applications, where aircraft surfaces can be exposed to humid environments, acid rain, and thermal cycling. Useful corrosion inhibitors can be a chromate-based corrosion inhibitor or, alternatively, a non-chromate corrosion inhibitor that is substantially free of chromium and chromium compounds.

Chromate-based corrosion inhibitors include strontium chromate, barium chromate, zinc chromate, and calcium chromate, and combinations thereof. Non-chromate corrosion inhibitors include strontium aluminum polyphosphate hydrate, calcium phosphate, zinc phosphate, zinc molybdate, and zinc aluminum polyphosphate hydrate, and combinations thereof. Preferably, the provided primer compositions can be formulated to be substantially or totally free of chromium and chromium compounds.

Corrosion inhibitors can be particulate solids having a median primary particle size (D50 of from 0.1 micrometers to 100 micrometers, and can be present in an amount of from 0.1 wt % to 30 wt %, from 2 wt % to 25 wt %, from 4 wt % to 20 wt %, or in some embodiments, less than, equal to, or greater than 0.1 wt %, 0.2, 0.5, 0.7, 1, 1.5, 2, 2.5, 3, 4, 5, 6, 7, 8, 9, 10, 12, 15, 17, 20, 22, 25, 26, 27, 28, 29, or 30 wt %, based on the overall weight of the primer composition excluding volatile solvents.

The primer composition can further include an inorganic filler. Useful inorganic fillers are not particularly restricted, and their addition can help prevent sagging during the process of curing the primer composition. An exemplary inorganic filler is fumed silica, which can be used as thickening agent increasing the viscosity of the primer composition when it is applied to the surface of the substrate to be protected.

In some embodiments, the inorganic filler is present in an amount of from 0.01 wt % to 15 wt %, from 0.5 wt % to 2 wt %, from 1 wt % to 5 wt %, or in some embodiments, less than, equal to, or more than 0.01 wt %, 0.02, 0.03, 0.04, 0.05, 0.07, 0.08, 0.09, 0.1, 0.2, 0.3, 0.4, 0.5, 0.7, 1, 1.5, 2, 2.5, 3, 4, 5, 6, 7, 8, 9, 10, 11, 12, 13, 14, 15, 16, 17, 18, 19, or 20 wt %, based on the overall weight of the primer composition excluding volatile solvents.

Methods of Making

The provided primer compositions can be made by first dispersing the solid first thermosetting resin (or resins) into water. In some embodiments, these resins are pre-dispersed in water. If not, the epoxy resins may be heated to above their melting point or dissolved in a solvent to form a concentrated solution, in which the solvent is later removed. The resultant liquid epoxy resin or epoxy resin solution can be dispersed into water adding it slowly under high shear agitation; by forcing the epoxy through metal plates containing numerous micron sized holes into rapidly agitated water, or by any other method known to those skilled in the art.

To maintain a stable emulsion in water, an effective amount of a surfactant is generally added to the dispersion. Such surfactants contain both hydrophilic and hydrophobic (lipophilic) portions and can include sodium and ammonium salts of long chain fatty acids, long chain fatty alcohol ethoxylates, alkylphenol ethoxylates or block polyoxyalkylene polyethers containing a hydrophobic moiety derived from repeating polyoxypropylene or polyoxybutylene groups or one or more long chain olefin oxide reaction products and a hydrophilic group comprising repeating oxyethylene groups.

Following dispersion of the thermosetting resin(s) into the aqueous phase, the curative is added. The curative may be also reduced to small particle size by known methods, including spray drying, solution precipitation, ball milling, sand milling, air jet milling, and the like. The fine curative particles can then be added to the resin dispersion and agitated until a uniform mixture is obtained. Alternatively, it can be advantageous to process the solid curative particles into finer particles while they are dispersed in the thermosetting resin dispersion. Such processing can be achieved by milling or any other method known in the art.

Before or after adding the curative, other additives such as dyes, pigments, corrosion preventatives, and the like, may be added and thoroughly mixed into the thermosetting resin and curative emulsion to complete the primer composition.

Methods of Use

The provided primer compositions can be coated onto a given substrate using any known method. For aerospace primers, it is common for primers to be efficiently applied via spray coating. The provided primer compositions can be effectively sprayed using any of the air driven or airless spray guns, such as high-volume low-pressure spray guns, known in the art.

Once the primer composition has been applied to the substrate from an aqueous dispersion, the composition is allowed to dry. Drying removes water and other volatiles from the composition and can occur at ambient or near ambient conditions, without need for heating. At ambient temperature, the drying time can be from 5 minutes to 300 minutes, from 10 minutes to 100 minutes, from 20 minutes to 50 minutes, or in some embodiments, less than, equal to, or greater than 10 minutes, 15, 20, 25, 30, 35, 40, 45, 50, 60, 70, 80, 90, 100, 110, 120, 150, 200, 250, or 300 minutes.

Components that are present as particulate solids, such as the first thermosetting resin and curative, do not remain as stacked particles as water is removed but rather coalesce with each other as the liquid resin (or resins) partially dissolve the solid resin (or resins) in the composition. Coalescence of the solid thermosetting resin can thus occur, at least in part, within the liquid thermosetting resin. The result is the formation of a continuous film that significantly reduces or eliminates the appearance of a powdery surface texture.

Once sufficiently dried, the primed substrate can be elevated in temperature to cure the primer composition, a reaction in which the first and second thermosetting resins react with the curative and each other to form a crosslinked network. Curing temperatures can be from 60° C. to 200° C., from 100° C. to 180° C., from 120° C. to 180° C., or in some embodiments, less than, equal to, or greater than 60° C., 65, 70, 75, 80, 85, 90, 95, 100, 110, 120, 130, 140, 150, 160, 170, 180, 190, or 200° C. Cured primer thickness can be from 1 micrometer to 20 micrometers, 2 micrometers to 10 micrometers, 3 micrometers to 8 micrometers, or in some embodiments, less than, equal to, or greater than 1 micrometer, 2, 3, 4, 5, 6, 7, 8, 9, 10, 11, 12, 13, 14, 15, 16, 17, 18, 19, or 20 micrometers.

Bake time, like curing temperature, can vary based on the application but is generally in the range of from 0.1 hours to 6 hours, 0.5 hours to 2 hours, 0.7 hours to 2 hours, or in some embodiments, less than, equal to, or greater than 0.1 hours, 0.2, 0.3, 0.4, 0.5, 0.6, 0.7, 0.8, 0.9, 1, 1.1, 1.2, 1.5, 2, 2.5, 3, 3.5, 4, 4.5, 5, 5.5, or 6 hours at suitable curing temperatures.

Once the primer has been applied to a substrate, such as a metal adherend, a second adherend, such as a second metal substrate or a composite substrate, can be adhered to the so-primed substrate in a normal manner by positioning a thermosettable adhesive, such as a structural adhesive, between the primed surface of the substrate and the second adherend, then applying heat and pressure such as to cure the adhesive. Use of such adhesives for a particular application, along with their suitability for such applications and associated curing conditions, are well known to those of ordinary skill.

Further illustrative embodiments are provided below, and not intended to be exhaustive:

1. An aqueous primer composition comprising: a first thermosetting resin that is a particulate solid at ambient conditions; a second thermosetting resin that is liquid at ambient conditions and acting as a reactive coalescent agent in which the first thermosetting resin is at least partially soluble; and a curative that is substantially water-insoluble and reactive with the first and second thermosetting resins, wherein the aqueous primer composition contains up to 4 percent of volatile solvents, other than water, relative to the overall weight of the aqueous primer composition.
2. The aqueous primer composition of embodiment 1, wherein the aqueous primer composition contains up to 3 percent of volatile solvents, other than water, relative to the overall weight of the aqueous primer composition.
3. The aqueous primer composition of embodiment 2, wherein the aqueous primer composition contains up to 2 percent of volatile solvents, other than water, relative to the overall weight of the aqueous primer composition.
4. The aqueous primer composition of any one of embodiments 1-3, wherein the first and second thermosetting resins are dispersed in water by a surfactant to form an emulsion.
5. The aqueous primer composition of any one of embodiments 1-4, wherein the first thermosetting resin comprises at least one epoxy resin.
6. The aqueous primer composition of embodiment 5, wherein the at least one epoxy resin comprises a novolac epoxy resin.
7. The aqueous primer composition of any one of embodiments 1-6, wherein the first thermosetting resin has a median primary particle size (D50) of from 50 nanometers to 300 micrometers.
8. The aqueous primer composition of embodiment 7, wherein the first thermosetting resin has a median primary particle size (D50) of from 200 nanometers to 200 micrometers.
9. The aqueous primer composition of embodiment 8 wherein the first thermosetting resin has a median primary particle size (D50) of from 1 micrometer to 100 micrometers.
10. The aqueous primer composition of any one of embodiments 1-9, wherein the first thermosetting resin is present in an amount of from 20 percent to 70 percent by weight, relative to the overall weight of the aqueous primer composition excluding volatile solvents.
11. The aqueous primer composition of embodiment 10, wherein the first thermosetting resin is present in an amount of from 30 percent to 60 percent by weight, relative to the overall weight of the aqueous primer composition excluding volatile solvents.
12. The aqueous primer composition of embodiment 11, wherein the first thermosetting resin is present in an amount of from 30 percent to 55 percent by weight, relative to the overall weight of the aqueous primer composition excluding volatile solvents.
13. The aqueous primer composition of any one of embodiments 1-12, wherein the second thermosetting resin comprises an epoxy resin.
14. The aqueous primer composition of embodiment 13, wherein the second thermosetting resin is present in an amount of from 5 percent to 40 percent by weight, relative to the overall weight of the aqueous primer composition excluding volatile solvents.
15. The aqueous primer composition of embodiment 14, wherein the second thermosetting resin is present in an amount of from 10 percent to 30 percent by weight, relative to the overall weight of the aqueous primer composition excluding volatile solvents.
16. The aqueous primer composition of embodiment 15, wherein the second thermosetting resin is present in an amount of from 10 percent to 25 percent by weight, relative to the overall weight of the aqueous primer composition excluding volatile solvents.
17. The aqueous primer composition of any one of embodiments 1-16, wherein the curative includes one or more of 2,2-bis-[4-(4-aminophenoxy)-phenyl]propane, 2,2'-diaminodiphenyl sulfone, and 4,4'-diaminodiphenyl sulfone.
18. The aqueous primer composition of any one of embodiments 1-17, wherein the curative is a particulate solid having a median primary particle size (D50) of from 50 nanometers to 300 micrometers.
19. The aqueous primer composition of embodiment 18, wherein the curative is a particulate solid having a median primary particle size (D50) of from 200 nanometers to 200 micrometers.
20. The aqueous primer composition of embodiment 19, wherein the curative is a particulate solid having a median primary particle size (D50) of from 1 micrometer to 100 micrometers.
21. The aqueous primer composition of any one of embodiments 1-20 further comprising fumed silica.

22. The aqueous primer composition of embodiment 24, wherein the fumed silica is present in an amount of from 0.5 percent to 2 percent by weight, relative to the overall weight of the aqueous primer composition excluding volatile solvents.

23. The aqueous primer composition of any one of embodiments 1-22, further comprising a corrosion inhibitor including one or more of: strontium aluminum polyphosphate hydrate, zinc phosphate, zinc molybdate and zinc aluminum polyphosphate hydrate.

24. The aqueous primer composition of embodiment 23, wherein the corrosion inhibitor is a particulate solid having a median primary particle size (D50) of from 0.1 micrometers to 100 micrometers.

25. A method of providing a continuous primer film on a substrate comprising the steps of: disposing onto the substrate the aqueous primer composition of any one of embodiments 1-24; removing water from the aqueous primer composition; coalescing the first thermosetting resin within the second thermosetting resin; and reacting the first and second thermosetting resins with the curative to obtain the continuous primer film.

26. A method of making an aqueous primer composition comprising the steps of: dispersing in water a first thermosetting resin, a second thermosetting resin that is liquid at ambient conditions in which the first thermosetting resin is at least partially soluble, and a water-insoluble curative to obtain a resin emulsion, wherein the first thermosetting resin and the water-insoluble curative are particulate solids at ambient conditions; and processing the particulate solids to a median particle size of from 50 nanometers to 300 micrometers for the thermosetting resin and a median particle size of from 50 nanometers to 300 micrometers for the water-insoluble curative, wherein the aqueous primer composition contains up to 4 percent by weight of volatile solvents, other than water, relative to the overall weight of the aqueous primer composition.

27. The method of making an aqueous primer composition of embodiment 26, wherein processing the particulate solids comprises milling the particulate solids in the resin emulsion.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

TABLE 1

| Designation | Description | Source |
| --- | --- | --- |
| AF-163-2 | A structural adhesive film, available under the trade designation "SCOTCH-WELD Structural Adhesive Film AF-163-2K 06" | 3M Company, St. Paul, MN, United States |
| ARCOSOLV | Propylene glycol (mono) butyl ether available under the trade designation "ARCOSOLV PNB" | LyondellBasell, Houston, TX, United States |
| BAPP | 2,2-bis-[4-(4-aminophenoxy)-phenyl]propane | TCI America, Portland, OR, United States |
| DC-29 | A leveling agent available under the trade designation "DOW CORNING 29" | Dow Inc., Midland, MI, United States |
| DER 669 | A diphenol A based solid epoxy available under the trade designation "D.ER. 669E" | Dow Inc., Midland, MI, United States |
| TDI Urea | A micronized grade of an aromatic substituted urea available under the trade designation "AMICURE UR-2T" | Evonik Corporation, Allentown, PA, United States |
| WD-510 | A liquid epoxy resin specifically designed for water dilution available under the trade designation "EPI-REZ Resin WD-510" | Hexion Inc., Columbus, OH, United States |
| EPZ-3546 | A 53 wt. % solids dispersion of "EPON RESIN 1007" resin in water and methoxy propanol (approximately 4-8 wt %) available under the trade designation "EPI-REZ 3546-WH-53" | Hexion Inc., Columbus, OH, United States |
| EPZ-5108 | A non-ionic bisphenol A epoxy novolac resin dispersion in water available under the trade designation "EPI-REZ DPW-5108" | Hexion Inc., Columbus, OH, United States |
| Wetlink 78 | (3-glycidyloxypropyl) methyldiethoxy-silane | Hexion Inc., Columbus, OH, United States |
| IPA | Isopropyl alcohol | Sigma Aldrich, St. Louis, MO, United States |
| Acetone | Acetone | Sigma Aldrich, St. Louis, MO, United States |
| 2-propoxyetthanol | 2-propoxyetthanol | Sigma Aldrich, St. Louis, MO, United States |
| M5 | An untreated fumed silica available under the trade designation "CAB-O-SIL M5" | Cabot Corporation, Boston, MA, United States |
| OAKITE 165 | A caustic wash solution available under the trade designation "OAKITE 165" | Chemetall GmbH, Frankfurt, Germany |
| SAPP | A pigment grade strontium aluminum polyphosphate corrosion inhibitor available under the trade designation "HEUCOPHOS SAPP" | Heubach GmbH, Langelsheim, Germany |
| ZAPP | A pigment grade zinc aluminum polyphosphate corrosion inhibitor available under the trade designation "HEUCOPHOS ZAPP" | Heubach GmbH, Langelsheim, Germany |

TABLE 1-continued

Materials

| Designation | Description | Source |
|---|---|---|
| PZ 3903-2 | Aqueous dispersion of Type 3 epoxy resin available under the designation "ARALDITE PZ 3903-2" | Huntsman Corporation, The Woodlands, TX, United States |

Test Methods

Grade 2024T3 bare aluminum panels were obtained from Erickson Metals of Minnesota, Inc., Coon Rapids, Minnesota. Prior to bonding with structural adhesive, the panels were subjected to the surface preparation process below.

Preparation of FPL Etched and Phosphoric Acid Anodized Aluminum Substrates

A bare aluminum panel was soaked in OAKITE 165 caustic wash solution for ten minutes at 85° C. (185° F.). The panel was then immersed in tap water for ten minutes at 21° C. (69.8° F.), followed by a continuous spray rinsing with tap water for approximately three minutes. The panel was then immersed in a Forest Products Laboratory (FPL) etch solution for ten minutes at 66° C. (151° F.), after which the panel was spray rinsed with water for approximately three minutes at 21° C. (69.8° F.). The etched panel was then anodized in a bath of 85% percent phosphoric acid at 22.2° C. (72° F.) for approximately twenty-five minutes at a voltage of 15 volts and a maximum current of 100 amps, rinsed with water for approximately three minutes at 21° C. (69.8° F.), allowed to drip dry for another ten minutes, then dried in an oven for ten minutes at 66° C. (151° F.). Within 24 hours of being anodized, the aluminum panel was primed with a primer composition as described in the following examples. The dried primer thickness was between 2.5-5.1 micrometers (0.1-0.2 mils).

Floating Roller Peel (FRP) Strength Test for Adhesive Film

Primed panels of 2024-T3 bare aluminum measuring 20.3 cm×7.6 cm×0.16 cm (8.0 inches×3.0 inches×0.063 inches), and 25.4 cm×7.6 cm×0.064 cm (10 inches×3 inches×0.025 inch), were prepared for testing as described above in "FPL Etched and Phosphoric Acid Anodized Aluminum Substrates". After removing the liner from one side, the AF-163-2 was applied by hand using a small rubber roller in such a manner as to exclude entrapped air and insure intimate contact between the exposed adhesive and the test panel substrate. The primed panels were bonded together and cured in an autoclave (refer to Adhesive Cure Cycle method defined below), then evaluated for floating roller peel strength in accordance with ASTM D-3167-76 with the following modification. Test strips measuring 1.27 cm (0.5 inches) wide were cut along the lengthwise direction of the bonded aluminum panels. A tensile testing machine operated at a rate of 30.5 cm/minute (6 inches/minute) at 21.2° C. (70° F.) was used to peel the thinner substrate from the thicker one and the results normalized to a width of 2.54 cm (1 inch). Test panels were prepared and evaluated (one for each example).

Adhesive Cure Cycle

The bonded sample was vacuum bagged to a pressure of approximately 94.8 kPa (28 inches mercury) in an autoclave, model number "ECONOCLAVE 3×5", from ASC Process Systems, Sylmar, California Autoclave pressure was increased to 310.3 kPa (45 psi), during which the vacuum bag was vented to the atmosphere once the autoclave pressure surpassed 103.4 kPa (15 psi). Autoclave temperature was then increased at a rate of 2.5° C. (4.5° F.) per minute to 121° C. (250° F.). After reaching the set point, the sample was held for 60 minutes at this temperature, then cooled at a rate of 2.8° C. (5° F.) per minute to 22.2° C. (72° F.) before releasing the pressure.

Scratch Resistance

The surface of an air-dried, uncured film adhered to a panel was rubbed with a finger or a dry, white cloth to see if any film material attached after rubbing several times. A sample passed if no film material was attached.

Preparatory Example 1 (PE1)

A solid curative-epoxy pre-milled dispersion was prepared as follows. 5.0 grams M5 was homogeneously dispersed in a mixture of 78.3 grams WD-510, 302.3 grams EPZ-3546 and 30.7 grams EPZ-5108 by means of a high-speed mixer operating at between 1,000-2,000 rpm for approximately 2-4 minutes at 25° C. (77° C.). With the mixer continuing to run at 300-500 rpm, 55.3 grams BAPP was blended into the dispersion, followed by 100 grams of distilled water and 0.32 gram of DC-29, and mixing continued until homogeneous. The milling was conducted in a MINICER Laboratory Mill (obtained from Netzsch of Exton, PA, United States) with 0.5 mm yttria-stabilized zirconia milling media at 250 ml/min flow rate and 4,320 rpm. Particle size was measured using a PARTICA LA-950 Laser Diffraction Particle Size Distribution Analyzer (Horiba, Irvine CA). The median (also referred to as D50) is the particle diameter at 50% of the cumulative distribution was 2.19 micrometers, while D90 is the particle diameter at 90% of the cumulative distribution was 3.64 micrometers.

Preparatory Example 2 (PE2)

80 grams of BAPP was dispersed into 320 g water and then milled. The milling was conducted in the MINICER Laboratory Mill with 0.5 mm yttria stabilized zirconia milling media operating at a 250 ml/min flow rate and 4,320 rpm. Particle size was measured using a PARTICA LA-950 Laser Diffraction Particle Size Distribution Analyzer as above. After milling for three minutes, the dispersion thickened. 400 grams water was then added into the mill hopper to flush out the rest of sample. The final BAPP concentration was approximately 10%. D50 was 10.18 micrometers and D90 was 15.42 micrometers.

Example 1 and Comparative Examples 1-3 (EX1 and CE1-CE3)

Primers were prepared by dispersing the materials identified in Table 2.

TABLE 2

Aqueous Primer Compositions (grams)

| Material | EX1 | CE1 | CE2 | CE3 |
|---|---|---|---|---|
| EPZ-5108 | 0.0 | 10.8 | 0.0 | 10.8 |
| DER 669 | 0.0 | 13.5 | 0.0 | 13.5 |
| PZ 3903-2 | 0.0 | 45.5 | 0.0 | 45.5 |
| TDI Urea | 5.9 | 3.0 | 5.9 | 3.0 |
| M5 | 0.0 | 1.8 | 0.0 | 1.8 |
| SAAP | 11.2 | 11.2 | 11.2 | 11.2 |
| ZAPP | 2.8 | 2.8 | 2.8 | 2.8 |

TABLE 2-continued

Aqueous Primer Compositions (grams)

| Material | EX1 | CE1 | CE2 | CE3 |
|---|---|---|---|---|
| PE1 | 172.0 | 0.0 | 172.0 | 0.0 |
| PE2 | 0.0 | 102 | 0.0 | 102 |
| Wetlink 78 | 1.5 | 1.5 | 1.5 | 1.5 |
| Acetone | 0.0 | 0.0 | 14.0 | 14.0 |
| DI water | 298.0 | 181.2 | 264.0 | 136.0 |
| 2-propoxy ethanol | 0.0 | 0.0 | 0.0 | 14.0 |
| IPA | 0.0 | 0.0 | 17.0 | 17.0 |
| ACROSOLV | 0.0 | 0.0 | 0.93 | 0.0 |

Example 1 (EX1)

11.2 grams of SAAP and 2.8 grams of ZAP were blended into 172 grams of PE1 by means of a high-speed mixer operating at between 1,000-2,000 rpm for approximately two to four minutes at 25° C. After five minutes, 298.0 grams of water was added, followed by 5.9 grams of TDI and then 1.5 grams of Wetlink 78. Mixing continued for another 15 minutes.

Comparative Example 1 (CE1)

10.8 grams of EPZ-5108 and 13.5 grams of DER 669 powder form made by spray dry coating, 45.5 grams of PZ 3903-2, 10.2 grams of BAPP, 3.0 grams of TDI urea, 1.8 grams of M5, 11.2 grams of SAAP, and 2.8 grams of ZAP were blended by means of a high-speed mixer operating between 1,000-2,000 rpm for approximately two to four minutes at 25° C. 1.5 grams of Wetlink 78 was added and mixed. 181.2 grams of deionized water was added to adjust the solid amount to 20%.

Comparative Example 2 (CE2)

11.2 grams of SAAP and 2.8 grams of ZAP were blended into 172 grams of PE1 by means of a high-speed mixer operating at between 1,000-2,000 rpm for approximately two to four minutes at 25° C. 11.4 grams of IPA, 3.1 grams of Acetone, and 0.93 grams ARCOSOLV were slowly added in three to five-minute intervals. After five minutes, 264.0 grams of water was added, followed by 5.9 grams of TDI, and then 1.5 grams of Wetlink 78. Mixing continued for another fifteen minutes.

Comparative Example 3 (CE3)

10.8 grams of EPZ-5108 and 13.5 grams of DER 669 powder form made by spray dry coating, 45.5 grams of 3903-2, 102 grams of PE2, 3.0 grams of TDI urea, 1.8 grams of M5, 11.2 grams of SAAP, 2.8 grams of ZAPP, 14 grams of Acetone, 14 grams of 2-propoxyehtanol and 17 grams of IPA by means of a high-speed mixer operating at between 1,000-2,000 rpm for approximately two to four minutes at 25° C. 1.5 grams of Wetlink 78 was added and mixed 136.0 grams of deionized water was added to adjust the solid amount to 20%.

The primers composition samples were sprayed on the aluminum panels and cured. The primers were also aged at 32.2° C. (90° F.) for seven days to test the primer performance on FRP. Results for scratch resistance and FRP testing are represented in Table 3 and Table 4.

TABLE 3

Scratch Resistance Results

| Primer Example | Pass/Fail |
|---|---|
| EX1 | Pass |
| CE1 | Fail |
| CE2 | Pass |
| CE3 | Pass |

TABLE 4

FRP Test Results

| Example | FRP Failure Mode-Initial | FRP Failure Mode after Aged at 32.2° C. (90° F.) |
|---|---|---|
| EX1 | Cohesive | Cohesive |
| CE1 | Cohesive | Cohesive |
| CE2 | Cohesive | Primer |
| CE3 | Cohesive | Primer |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An aqueous primer composition comprising:
   a first thermosetting resin that is a particulate solid at ambient conditions;
   a second thermosetting resin that is liquid at ambient conditions and acting as a reactive coalescent agent in which the first thermosetting resin is at least partially soluble; and
   a curative that is substantially water-insoluble and reactive with the first and second thermosetting resins,
   a surfactant,
   wherein the aqueous primer composition contains up to 4 percent of volatile solvents, other than water, relative to the overall weight of the aqueous primer composition,
   wherein the aqueous primer composition is a dispersion in water,
   wherein the first thermosetting resin is present in an amount of from 20 percent to 70 percent by weight, relative to the overall weight of the aqueous primer composition excluding volatile solvents,
   wherein the second thermosetting resin is present in an amount of from 5 percent to 40 percent by weight, relative to the overall weight of the aqueous primer composition excluding volatile solvents.

2. The aqueous primer composition of claim 1, wherein the first thermosetting resin comprises at least one epoxy resin.

3. The aqueous primer composition of claim 2, wherein the at least one epoxy resin comprises a novolac epoxy resin.

4. The aqueous primer composition of claim 1, wherein the first thermosetting resin has a median primary particle size (D50) of from 50 nanometers to 300 micrometers.

5. The aqueous primer composition of claim 1, wherein the second thermosetting resin comprises an epoxy resin.

6. The aqueous primer composition of claim 1, wherein the curative includes one or more of 2,2-bis-[4-(4-aminophenoxy)-phenyl] propane, 2,2'-diaminodiphenyl sulfone, and 4,4'-diaminodiphenyl sulfone.

7. The aqueous primer composition of claim 1, wherein the curative is a particulate solid having a median primary particle size (D50) of from 50 nanometers to 300 micrometers.

8. The aqueous primer composition of claim 1 further comprising fumed silica.

9. The aqueous primer composition of claim 1, further comprising a corrosion inhibitor including one or more of: strontium aluminum polyphosphate hydrate, zinc phosphate, zinc molybdate, and zinc aluminum polyphosphate hydrate.

10. A method of providing a continuous primer film on a substrate comprising the steps of:
- disposing onto the substrate the aqueous primer composition of claim 1;
- removing water from the aqueous primer composition;
- coalescing the first thermosetting resin within the second thermosetting resin; and
- reacting the first and second thermosetting resins with the curative to obtain the continuous primer film.

\* \* \* \* \*